United States Patent [19]

Jones

[11] Patent Number: 5,386,705
[45] Date of Patent: Feb. 7, 1995

[54] STAGED REGENERATIVE SORPTION HEAT PUMP

[75] Inventor: Jack A. Jones, Los Angeles, Calif.

[73] Assignee: California Institute of Technology, Pasadena, Calif.

[21] Appl. No.: 113,611

[22] Filed: Aug. 27, 1993

[51] Int. Cl.$^6$ ............................................. F17C 11/00
[52] U.S. Cl. ...................................... 62/480; 62/46.2; 165/104.12
[58] Field of Search ...................... 62/46.1, 46.2, 467, 62/480, 477, 481; 165/104.12

[56] References Cited

U.S. PATENT DOCUMENTS

| | | | |
|---|---|---|---|
| 4,178,987 | 12/1979 | Bowman et al. | 165/1 |
| 4,732,008 | 3/1988 | DeVault | 62/79 |
| 4,765,395 | 8/1988 | Paeye et al. | 165/104.12 |
| 4,827,728 | 5/1989 | DeVault et al. | 62/79 |
| 4,848,994 | 7/1989 | Rockenfeller | 62/4 |
| 5,025,635 | 6/1991 | Rockenfeller et al. | 62/106 |
| 5,042,259 | 8/1991 | Jones | 62/46.2 |
| 5,046,319 | 9/1991 | Jones | 62/46.2 |
| 5,079,928 | 1/1992 | Rockenfeller et al. | 62/106 |
| 5,157,938 | 10/1992 | Bard et al. | 62/335 |

OTHER PUBLICATIONS

Improving adsorption cryocoolers by Multi-stage Compressors and Reducing Void volume, Cryogenics, 1986, vol. 26, p. 450 by S. Bard.

Improving adsorption Cryocoolers By Multi-stage Compressors and Reducing Void Volume, Cryogenics, 1986, vol. 26, p. 450, by S. Bard.

Sorption Cooler Technology Development at JPL, Cryogenics, 1990, vol. 30, p. 239, J. A. Jones et al.

Design & Component Test Performance Of An Efficient 4W, 130K Sorption Refrigerator, Advances In Cryogenic Eng., vol. 35, p. 1367 (1990).

High Efficiency Sorption Refrigerator Design, Advances In Cryogenic Eng., vol. 35, p. 1375 (1990).

Primary Examiner—Henry A. Bennett
Assistant Examiner—William C. Doerrler
Attorney, Agent, or Firm—F. Eugene Logan

[57] ABSTRACT

A regenerative adsorbent heat pump process and system for cooling and heating a space. A sorbent is confined in a plurality of compressors of which at least four are first stage and at least four are second stage. The first stage operates over a first pressure region and the second stage over a second pressure region which is higher than the first. Sorbate from the first stage enters the second stage. The sorbate loop includes a condenser, expansion valve, evaporator and the compressors. A single sorbate loop can be employed for single-temperature-control such as air conditioning and heating. Two sorbate loops can be used for two-temperature-control as in a refrigerator and freezer. The evaporator temperatures control the freezer and refrigerator temperatures. Alternatively the refrigerator temperature can be cooled by the freezer with one sorbate loop. A heat transfer fluid is circulated in a closed loop which includes a radiator and the compressors. Low temperature heat is exhausted by the radiator. High temperature heat is added to the heat transfer fluid entering the compressors which are desorbing vapor. Heat is transferred from compressors which are sorbing vapor to the heat transfer fluid, and from the heat transfer fluid to the compressors which are desorbing vapor. Each compressor is subjected to the following phases, heating to its highest temperature, cooling down from its highest temperature, cooling to its lowest temperature, and warming up from its lowest temperature. The phases are repeated to complete a cycle and regenerate heat.

34 Claims, 9 Drawing Sheets

STAGED REGENERATIVE SORPTION HEAT PUMP

ORIGIN OF INVENTION

The invention described herein was made in the performance of work under a NASA Contract, and is subject to the provisions of Public Law 96-517 (35 USC 202) in which the Contractor has elected to retain title.

BACKGROUND OF THE INVENTION

1. Technical Field

This invention is directed towards regenerative heat pump system and method using a working fluid or refrigerant and an adsorbent material.

2. Discussion of the Invention

Heat pumps using solid adsorbent beds are well known as shown by U.S. Pat. Nos. 4,610,148, 4,637,218 4,694,659, 5,025,635, 5,046,319 and 5,079,928. In general since adsorbents take up the working fluid when cooled and desorb the working fluid when heated, adsorbent heat pumps are said to be heat driven. Often in adsorbent heat pumps two beds of sorbents are used, one to adsorb the working fluid while the other bed is desorbing the working fluid. Alternate heating and cooling of the beds is the conventional procedure. When used in air conditioning, heat from an interior room may be used to evaporate the working fluid in an evaporator with heat rejection to the environment at ambient temperatures.

In all of such systems the efficiency of the apparatus is measured by its coefficient of performance or "COP". By the term "COP" as used herein is meant the ratio of heating or cooling work performed divided by the amount of power required to do the work. Since cooling $COP_S$, or $COP_{CS}$, are generally lower than heating $COP_S$, or $COP_{HS}$, many systems are rated on their cooling $COP_S$.

U.S. Pat. No. 4,637,218 mentions cooling $COP_S$ between 1 and 2 and heating $COP_S$ between 2 and 3. In U.S. Pat. No. 4,637,218 a hot coolant is pumped from a hot 204.4° C. sorbent compressor to a cooler 37.8° C. sorbent compressor, while at the same time cold coolant is pumped from the cooler sorbent compressor to the hotter sorbent compressor. Both compressors exchange heat yielding a typical heat regeneration efficiency of about 80%. The remainder of the heat is supplied by a boiler at about 204° C.

U.S. Pat. No. 4,610,148 reports a theoretical heating COP of about 3 and a cooling COP of about 2, and, a calculated operating $COP_H$ of about 2.6 and a calculated operating $COP_C$ of about 1.6.

FIG. 3 of U.S. Pat. No. 4,694,859, which is concerned with a dual sorbent bed heat pump, shows heating and cooling COP's as a function of a dimensionless thermal wavelength parameter.

Cryogenic cooler systems for sorption refrigerators using a sorption compressor, a heating/cooling loop and a Joule-Thomson expansion valve, or "J-T" valve, with methane as a refrigerant gas and charcoal as the adsorbent, are disclosed in articles entitled "High Efficiency Sorption Refrigerator Design", and, "Design and Component Test Performance of an Efficient 4 W, 130K Sorption Refrigerator" in Advances In Cryogenic Engineering, Vol. 35, Plenum Press, New York, 1990. Desorption occurs at 4.46 MPa (646 psia), i.e. $P_H$, and adsorption at 0.15 MPa (22 psia), i.e. $P_L$, or a pressure ratio of about 30, i.e. $P_H/P_L=30$. Methane is expanded from 4.46 MPa to 0.15 MPa to achieve cooling below 130K. ($-143°$ C.). The sorbent is heated from 240K. ($-33°$ C.) to 600K. (327° C.) to desorb the methane.

A two staged adsorption system is disclosed in an article entitled "Improving Adsorption Cryocoolers By Multi-stage Compression And Reducing Void Volume", Cryogenics, 1986, Vol. 26, page 456, by S. Bard. Refrigerant is passed between carbon adsorbent stages. However, a circuit for the heat transfer fluid for regenerating heat was not shown. It is understood that the heat was simply exhausted and not regenerated.

U.S. Pat. No. 5,025,635 discloses staged adsorbers each containing different adsorbents, i.e. $MgBr_2$, $CoBr_2$, $CoCl_2$, $CaBr_2$ and $SrBr_2$ in a single housing.

U.S. Pat. No. 5,079,928 mentions that some reactors in a staged system can be combined into a single reactor.

Regenerative heat transfer fluid circuits for a single stage system are disclosed in U.S. Pat. No. 5,046,319.

Other references of interest are U.S. Pat. Nos. 4,732,008, 4,827,728 and 4,848,994, and an article entitled "Sorption Cooler Technology Development At JPL, Cryogenics, 1990, Vol. 30, page 239, by J. A. Jones.

SUMMARY OF THE INVENTION

Accordingly, there is provided by the principles of this invention a regenerative sorbent heat pump process for cooling and heating an interior space. The process comprises providing a working fluid and a sorbent therefor, and confining the sorbent in a plurality of compressor zones. At least four of the compressor zones are included in a first stage which operates over a first pressure region, and at least four are included in a second stage which operates over a second pressure region which is different and higher than the first pressure region.

Working fluid vapor from an evaporation zone is introduced into at least one of the first stage compressor zones and the vapor is sorbed by the sorbent therein at a predetermined first pressure $P_L$. The process further comprises desorbing the working fluid vapor from the sorbent in at least one of the second stage compressor zones and removing working fluid vapor therefrom at a predetermined second pressure $P_H$ which is higher than $P_L$, desorbing the working fluid vapor from the sorbent in at least one of the first stage compressor zones at a predetermined third pressure $P_M$ which is higher than $P_L$ but lower than $P_H$, and introducing the desorbed working fluid vapor therefrom into at least one of the second stage compressor zones and sorbing the desorbed vapor by the sorbent therein at a pressure of about $P_M$.

The process also comprises minimizing the thermal capacitance differences between the first stage compression zones, and minimizing the thermal capacitance differences between the second stage compression zones. In one embodiment this is achieved by making the first stage compression zones identical in all aspects, and making the second stage compression zones identical in all aspects.

Working fluid vapor removed from the second stage compressor zone at a pressure of about $P_H$ is condensed in a condensation zone and the latent heat is transferred from the working fluid to the environment when cooling an interior space, or to the interior space when heating the interior space, thereby forming a working fluid liquid. The liquid is expanded through a Joule- Thomson means, evaporated in the evaporation zone at a pressure of about $P_L$ to form working fluid vapor by transferring heat from the interior space when cooling the interior space, or from the environment when heating the interior space, to the evaporation zone thereby cooling or heating the interior space. Thus, the above described operations are conducted in a closed working fluid loop.

A heat transfer fluid is circulated in another closed loop which includes a heat removal zone and the first stage and second stage compressor zones. The heat transfer fluid is prevented from directly contacting the sorbent. The process further comprises transferring low temperature heat from the heat transfer fluid in the heat removal zone to the environment, adding high temperature heat from a heat source over a predetermined period of time to the first stage compressor zone which is desorbing the working fluid vapor at $P_M$, adding high temperature heat from a heat source over a predetermined period of time to the second stage compressor zone which is desorbing the working fluid vapor at $P_H$, and transferring heat from the sorbent in the compressor zones which are sorbing working fluid vapor to the heat transfer fluid and from the heat transfer fluid to the sorbent in the compressor zones which are desorbing working fluid vapor thereby regenerating heat.

The above operational steps are repeated for circulating the working and heat transfer fluids sequentially in each of the other first and second stage compressor zones thereby completing a cycle.

In another embodiment the process further comprising exchanging heat between (i.) the working fluid liquid after its condensation and before its expansion and (ii.) the working fluid vapor from the evaporation zone thereby forming a heated working fluid vapor for introducing into the first stage compression zones.

In one embodiment where the amount of sorbent in the first stage compression zones is $M_1$, and the amount of sorbent in the second stage compression zones is $M_2$, the process further comprises maximizing the overall process efficiency by adjusting or fixing the ratio $M_2/M_1$ to a predetermined value which is approximately equal to

[(the adsorptive capacity of the sorbent for the working fluid at $P_L$ and the lowest temperature in the first stage compression zones) minus (the adsorptive capacity of the sorbent for the working fluid at $P_M$ and the highest temperature in the first stage compression zones)] divided by [(the adsorptive capacity of the sorbent for the working fluid at $P_M$ and the lowest temperature in the second stage compression zones) minus (the adsorptive capacity of the sorbent for the working fluid at $P_H$ and the highest temperature in the second stage compression zones)], and maintaining the $P_H/P_M$ ratio approximately equal to the $P_M/P_L$ ratio.

In still another embodiment the ratio $M_2/M_1$ is from about 0.3 to about 0.9.

In one embodiment the minimizing of the thermal capacitance differences of the compression zones comprises equalizing the thermal capacitance of the first stage compression zones to each other, and equalizing the thermal capacitance of the second stage compression zones to each other. This can be accomplished by making the physical and chemical aspects of all first stage compression zones identical, and the physical and chemical aspects of all second stage compression zones identical.

A further embodiment comprises cooling the coolest compressor in the first stage to a predetermined first stage bottoming temperature. This can be achieved by circulating the heat transfer fluid in a closed loop which comprises the heat removal zone and the coolest first stage compressor zone but not the other first stage compressor zones.

Yet another embodiment comprises cooling the coolest compressor in the second stage to a predetermined second stage bottoming temperature. This can be achieved by circulating the heat transfer fluid in a closed loop which comprises the heat removal zone and the coolest second stage compressor zone but not the other second stage compressor zones.

In one embodiment the first stage is cooled to its bottoming temperature and the second stage is cooled to its bottoming temperature simultaneously. For example, in one embodiment the second closed loop comprises the heat removal zone, the coolest first stage compressor zone and the coolest second stage compressor zone but none of the other first stage or second stage compressor zones. In another embodiment the heat transfer fluid is circulated from the heat removal zone to the coolest first stage compressor zone, from the coolest first stage compression zone to the coolest second stage compressor zone, and from the coolest second stage compression zone to the heat removal zone. In still another embodiment the heat transfer fluid is circulated from the heat removal zone to a parallel circuit of the coolest first stage compressor zone and the coolest second stage compressor zone, and from the parallel circuit to the heat removal zone. In yet another embodiment the second stage bottoming temperature is about equal to the first stage bottoming temperature.

In another embodiment the number of second stage compression zones is equal to the number of first stage compression zones.

In one embodiment the number of compressor zones is eight, and in another embodiment the number of compressor zones is twelve. However, any number of compressors can be used if desired as long as the number is at least eight. Although systems with less than eight compression zones can be used they are not as efficient and do not enable simultaneous sorption and desorption by at least one compression zone in each stage.

In one embodiment the process further comprises maintaining the $P_H/P_M$ ratio and the $P_M/P_L$ ratio between about 1.1 and about 5. In another embodiment the $P_H/P_M$ ratio and the $P_M/P_L$ ratio is between about 1.5 and about 2, and in yet another embodiment the $P_H/P_M$ ratio and the $P_M/P_L$ ratio is about 1.7.

In one embodiment the working fluid is ammonia, the sorbent is carbon, $P_L$ is from about 20 to about 100 psia, $P_M$ is from about 75 to about 175 psia, and $P_H$ is from about 150 to about 300 psia, and in another embodiment $P_L$ is about 73 psia, $P_M$ is about 124 psia, $P_H$ is about 212 psia. In a further embodiment the predetermined first stage and second stage bottoming temperatures are from about 70° to about 150° F., and in another embodiment these bottoming temperatures are about 100° F.

Besides ammonia/carbon as the sorbate/sorbent other reactants can be used. For example, in one embodiment the sorbate or working fluid is selected from the group consisting of fluorine substituted ethanes, and, fluorine and chlorine substituted ethanes. In another embodiment the working fluid is selected from the group consisting of 1,1,1,2-tetrafluoroethane or $CF_3CH_2F$ referred to herein as "R134a", 2-chloro-1,1,1,2-tetrafluoroethane or $CF_3CHClF$ referred to herein as "R124", 1,1-dichloro-2,2,2-trifluoroethane or $CHCl_2CF_3$ referred to herein as "R123", ammonia, propanes and water.

In one embodiment the sorbent is selected from the group consisting of activated carbons, zeolites, silica gels and alumina. A preferred activated carbon is made from coconut shells.

In one embodiment the heat transfer fluid is selected from the group consisting of mixtures of diphenyl and diphenyl oxide, ortho-dichlorobenzene, ethylene glycol, methoxypropanol, silicon oils and water. Examples of some heat transfer fluids are the various Dowtherm TM fluids.

There is also provided by the principles of this invention a regenerative sorbent heat pump process for cooling a refrigeration space and a freezer space. The working fluids and heat transfer fluid circuits described above can be used with the evaporation zone operating at somewhat below the desired freezer temperature and the condensation zone operating at somewhat above ambient temperature. In this embodiment the refrigeration zone is cooled by the freezer zone and only one working fluid circuit is required. In still another embodiment the ratio of the amount sorbent in the second stage to the amount of sorbent in the first stage compression zones, or $M_2/M_1$ ratio, is from about 0.3 to about 0.9.

In another embodiment the process differs from the process for cooling and heating an interior space by having two working fluid loops, one for cooling the refrigeration space, and one for cooling the freezer space. The working fluid vapor from a freezer evaporation zone is introduced into at least one of the first stage compressor zones where the working fluid vapor is sorbed by the sorbent therein at a predetermined first pressure $P_L$, and the working fluid vapor is desorbed from the sorbent in at least one of the second stage compressor zones and removed therefrom at a predetermined second pressure $P_H$ which is higher than $P_L$. Working fluid vapor is desorbed from the sorbent in at least one of the first stage compressor zones at a predetermined third pressure $P_M$ which is higher than $P_L$ but lower than $P_H$, and introduced together with working fluid vapor from a refrigeration evaporation zone into at least one of the second stage compressor zones, and working fluid vapor is sorbed by the sorbent therein at a pressure of about $P_M$.

The working fluid vapor removed from the second stage compressor zone at a pressure of about $P_H$ is condensed in a condensation zone and heat is transferred from the working fluid to the environment thereby forming a working fluid liquid. The process further comprises expanding a first portion of the working fluid liquid and evaporating it in the freezer evaporation zone at a pressure of about $P_L$ by transferring heat from a freezer space to the freezer evaporation zone thereby cooling the freezer space, and expanding a second portion the working fluid liquid and evaporating it in the refrigeration evaporation zone at a pressure of about $P_M$ by transferring heat from a refrigeration space to the refrigeration evaporation zone thereby cooling the refrigeration space.

In this embodiment one evaporation zone is operated at or somewhat below the desired freezer temperature, the other evaporation zone is operated at or somewhat below the desired refrigerator temperature, and the condensation zones or zones are operated at or somewhat above ambient temperature. In further embodiment heat is exchanged between (i.) the first portion of the working fluid liquid before its expansion and (ii.) the working fluid vapor from the freezer evaporation zone thereby forming a heated freezer working fluid vapor; and heat is also exchanged between (i.) the second portion of the working fluid liquid before its expansion and (ii.) the working fluid vapor from the refrigerator evaporation zone thereby forming a heated refrigerator working fluid vapor. In another embodiment the wherein the amount of sorbent in the first stage compression zones is $M_1$, the amount of sorbent in the second stage compression zones is $M_2$, the process also comprises adjusting the ratio $M_2/M_1$ to a predetermined value which is approximately equal to $$\left[\frac{C_B - C_D}{C_F - C_H}\right] \cdot \left[\left(\frac{Q_R}{Q_F} \cdot \frac{H_Y - H_Z}{H_W - H_X}\right) + 1\right]$$

In this equation
$C_B$ is the adsorptive capacity of the sorbent for the working fluid at $P_L$ and the lowest temperature in the first stage compression zones, $C_D$ is the adsorptive capacity of the sorbent for the working fluid at $P_M$ and the highest temperature in the first stage compression zones, $C_F$ is the adsorptive capacity of the sorbent for the working fluid at $P_M$ and the lowest temperature in the second stage compression zones, $C_H$ is the adsorptive capacity of the sorbent for the working fluid at $P_H$ and the highest temperature in the second stage compression zones, $H_X$ is the enthalpy of the second portion of the working fluid liquid after its condensation and before its expansion, $H_Y$ is the enthalpy of the heated freezer working fluid vapor, $H_W$ is the enthalpy of the heated refrigerator working fluid vapor, $H_Z$ is the enthalpy of the first portion of the working fluid liquid after its condensation and before its expansion, $Q_R$ is a predetermined design heat load in the refrigerator, and $Q_F$ is a predetermined design heat lead in the freezer.

In still another embodiment the ratio $M_2/M_1$ is from about 0.3 to about 3.0.

The operation of the heat transfer fluid loop for the refrigerator/freezer process is the same as that described for the process for cooling and heating an interior space.

In one embodiment the working fluid is ammonia, the sorbent is carbon, $P_L$ is from about 10 to about 40 psia, $P_M$ is from about 40 to about 90 psia, and $P_H$ is from about 150 to about 300 psia, and in another embodiment $P_L$ is about 30 psia, $P_M$ is about 73 psia, and $P_H$ is about 212 psia. In a further embodiment the predetermined first stage and second stage bottoming temperatures are from about 70° to about 150° F., and in another embodiment these bottoming temperatures are about 100° F. Other sorbate/sorbent systems can also be used such as those mentioned above.

DESCRIPTION OF THE PREFERRED EMBODIMENTS

Figure 1:
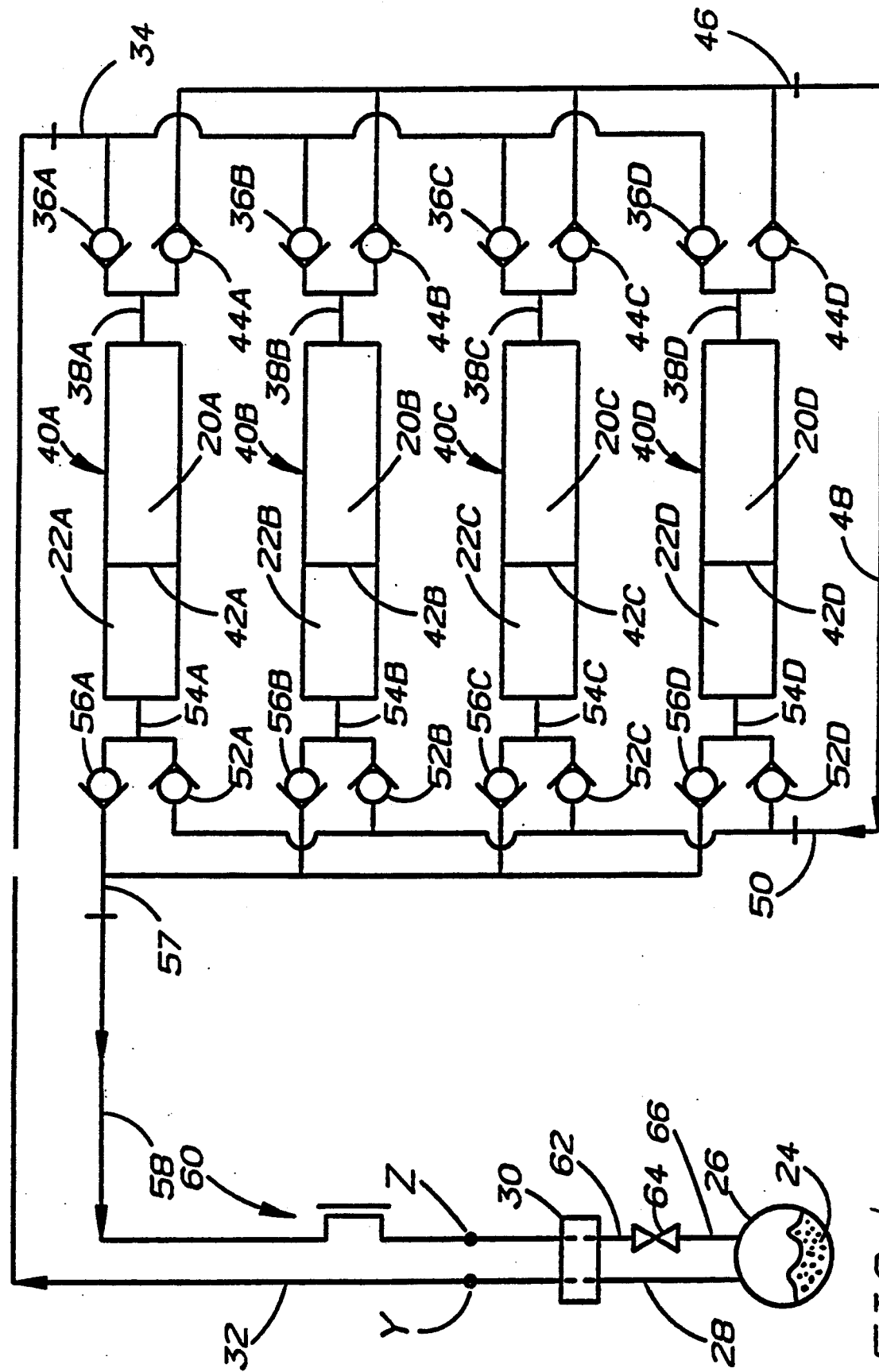
FIG. 1 is a schematic diagram of a two stage compression series/series regenerative heat pump process for heating and cooling an interior space having four first stage and four second stage compression zones showing the working fluid circuit.
Figure 2:
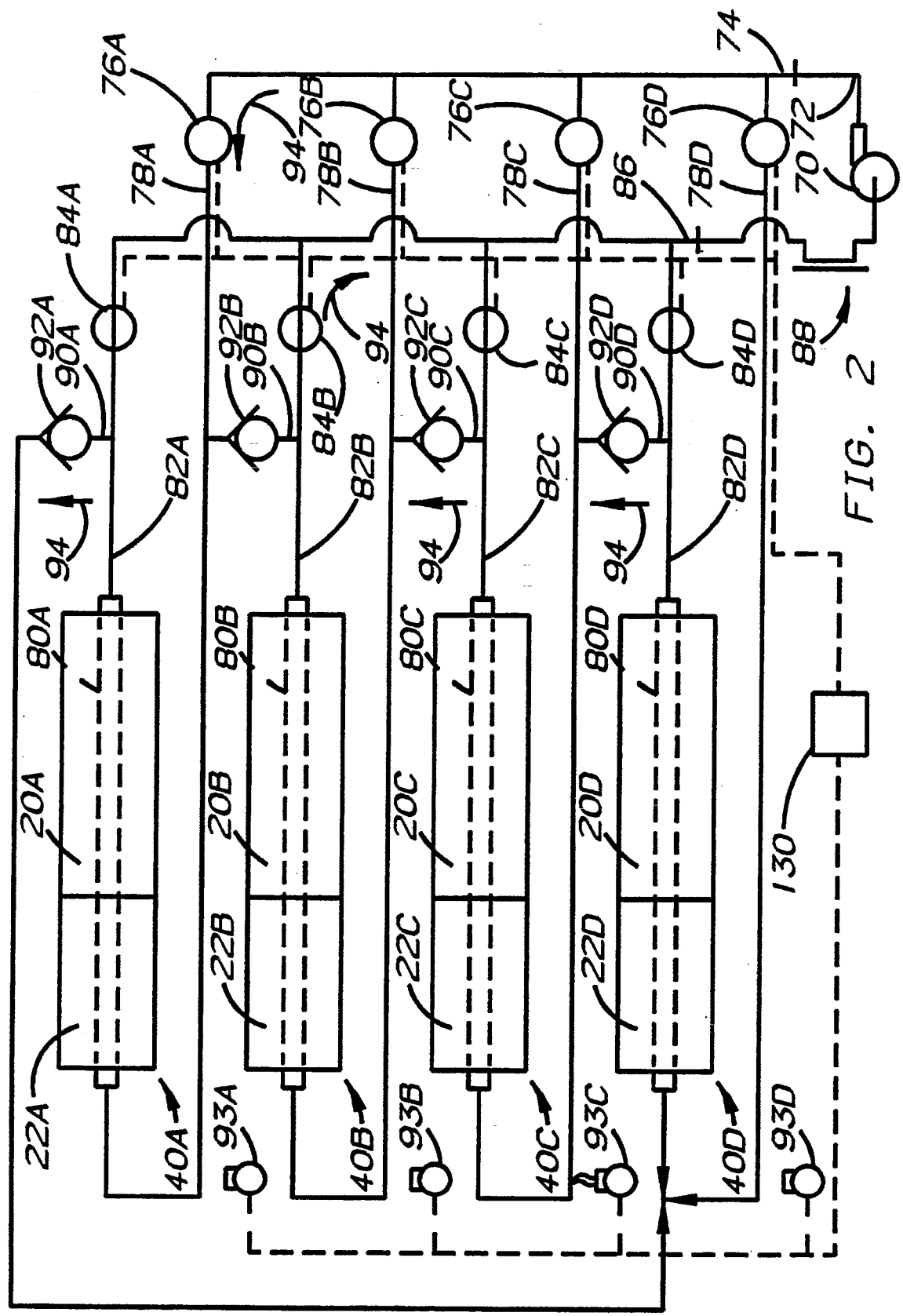
FIG. 2 is a schematic diagram showing the regenerative heat transfer fluid circuit for the system of FIG. 1.

With regard to the figures, identical element numbers are employed to designate identical or like parts in the several figures. Referring first to FIG. 1, a schematic diagram of a two stage compression regenerative heat pump process is shown for heating and cooling an interior space such as a room or building. For ease of illustration, only the refrigerant or working fluid circuit is shown in FIG. 1. The heat transfer fluid circuit for the system shown in FIG. 1 is shown in FIG. 2. As can be seen the system has four first stage compression zones 20A, 20B, 20C and 20D, and four second stage compression zones 22A, 22B, 22C and 22D.

A quantity of ammonia 24, as the working fluid, contained in evaporator 26 is evaporated at pressure $P_L$ and the thusly produced vapor is conveyed through line 28 which is in heat transfer communication with heat exchanger 30 and connected to line 32, which is connected to manifold 34. Manifold 34 is connected to first stage inlet check valves 36A, 36B, 36C and 36D, which are connected to lines 38A, 38B, 38C and 38D, respectively, which are in fluid communication with first stage compression zones 20A, 20B, 20C and 20D, respectively.

First stage compression zones 20A, 20B, 20C and 20D, and second stage compression zones 22A, 22B, 22C and 22D, respectively, are housed in chambers 40A, 40B, 40C and 40D, respectively, and separated by partitions 42A, 42B, 42C and 42D, respectively. Each partition prevents direct fluid communication between the first stage and second stage compression zones in the chambers in which the partitions are contained.

Lines 38A, 38B, 38C and 38D from first stage compression zones 20A, 20B, 20C and 20D are also connected to first stage outlet check valves 44A, 44B, 44C and 44D, respectively, which are connected to manifold 46, which is connected to line 48, which is connected to manifold 50, which is connected to second stage inlet check valves 52A, 52B, 52C and 52D, which are connected to lines 54A, 54B, 54C and 54D, respectively, which are in fluid communication with second stage compression zones 22A, 22B, 22C and 22D, respectively.

Lines 54A, 54B, 54C and 54D from the second stage compression zones are also connected to second stage outlet check valves 56A, 56B, 56C and 56D, respectively, which are connected to manifold 57, which is connected to line 58, which is connected to condenser 60, which is connected to line 62. Line 62 is in heat transfer communication with line 30 in heat exchanger 30. Line 62 is connected to expansion valve 64, which is connected to line 66, which is connected to evaporator 28 thereby forming a closed working fluid loop.

When the system is operated, both the first stage and second stage compression zones contain carbon as the sorbent for the working fluid ammonia.

First stage inlet check valves 36A, 36B, 36C and 36D will open at a pressure of about 73 psia or $P_L$, first stage outlet check valves 44A, 44B, 44C and 44D and second stage inlet check valves 52A, 52B, 52C and 52D will open at a pressure of about 124 psia or $P_M$, and second stage outlet check valves 56A, 56B, 56C and 56D will open at a pressure of about 212 psia or $P_H$.

Referring to FIG. 2, heat is regenerated by transferring heat from one compression zones to another. For ease of illustration the working fluid circuit has been omitted from FIG. 2 and only the heat transfer fluid circuit is shown.

Cooled working fluid is conveyed by pump 70 through line 72 to manifold 74 which is connected to inlet solenoid valves 76A, 76B, 76C and 76D, which are connected to lines 78A, 78B, 78C and 78D, respectively, which are connected to the inlet of internal heat transfer conduits 80A, 80B, 80C and 80D, respectively, within chambers 40A, 40B, 40C and 40D, respectively. Conduits 80A, 80B, 80C and 80D are in heat transfer communication with first stage part of chambers 40A, 40B, 40C and 40D, respectively, and sorbents therein, and thereafter in heat transfer communication with second stage part of chambers 40A, 40B, 40C and 40D, respectively, and sorbents therein. The outlet of conduits 80A, 80B, 80C and 80D are connected to outlet lines 82A, 82B, 82C and 82D, respectively, which are connected to outlet solenoid valves 84A, 84B, 84C and 84D, respectively, which are connected to manifold 86. The outlet of manifold 86 is connected to radiator 88, which is connected to the inlet of pump 70 thereby forming a closed heat transfer fluid loop.

Outlet lines 82A, 82B, 82C and 82D are also connected to stage-to-stage lines 90A, 90B, 90C and 90D, respectively, which are connected to check valves 92A, 92B, 92C and 92D, respectively, which are connected to the next stage heat transfer inlet lines 78D, 78A, 78B and 78C, respectively, thereby enabling regenerative series heat transfer operation between chambers 40A, 40B, 40C and 40D.

Each stage of the compression zones in FIG. 2 is subjected to the following four phases, (1) heating to the highest temperature of the of the stage, (2) cooling down from the highest temperature, (3) cooling to the lowest temperature, and (4) warming up from the lowest temperature. Each phase comprises a base or first part with external heating of a heat transfer fluid inlet line, i.e. line 78A, 78B, 78C or 78D, and an extended or second part without external heating of any heat transfer fluid inlet line. During these four phases the heat transfer fluid is first circulated in the base part of the phase continuously through all eight compression zones. External heating is provided by heating means 93A, 93B, 93C and 93D, which in the embodiment of FIG. 2 is provided by a group of four natural gas burners. The base part of the phase shown in FIG. 2 has solenoid valves 76A and 84B open while all of the other six solenoid valves are closed. In this base part of the phase chamber 40A is cooling to a lower temperature, chamber 40B is warming up from the lowest temperature, chamber 40C is heating up to the highest temperature of the stage by external heating of inlet heat transfer fluid line 78C with heater 93C, and chamber 40D is cooling down from the highest temperature. The heat transfer fluid flow through the system is in the direction of arrows 94. In the base part of this phase the heat transfer fluid flows from pump 70 through the open valves in the following order 76A, 92A, 92D, 92C, 84B, and then back to pump 70.

Figure 3:
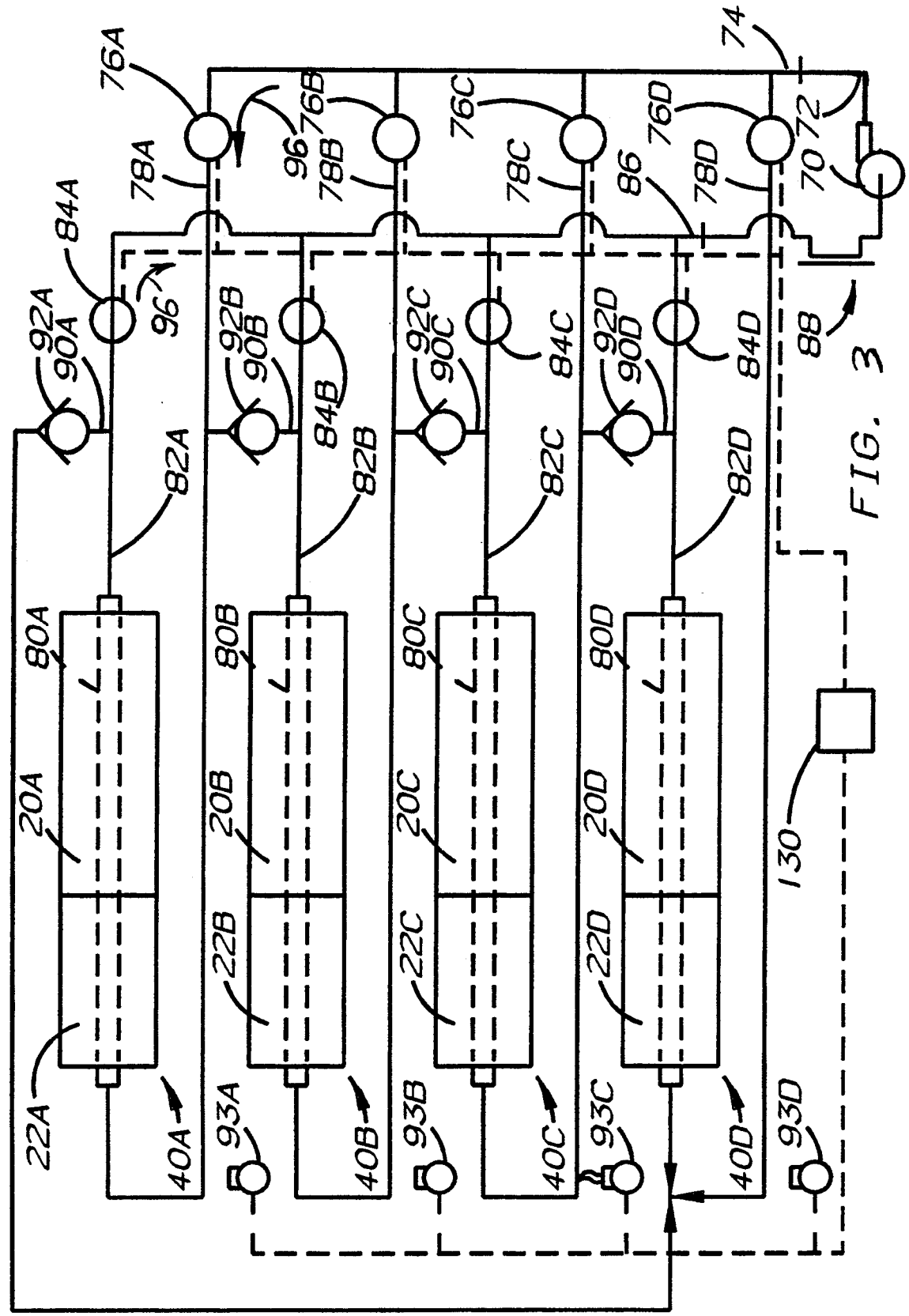
FIG. 3 is a schematic diagram showing a bottoming phase for the system of FIGS. 1 and 2.

At the end of the base part the phase is modified. External heater 93C is turned off and the heat transfer fluid is directed only to the coolest compression zone in the extended part of the phase as shown in FIG. 3 wherein only solenoid valves 76A and 84A are open and all other solenoid valves are closed thereby circulating the heat transfer fluid only through chamber 40A and lowering its temperature to a predetermined bottoming temperature. In the extended part of this phase, the heat transfer fluid flows through the system in the direction of arrows 96. Therefore, in the extended part of this phase the heat transfer fluid flows from pump 70 through the open valves in the following order 76A, 84A, and then back to pump 70.

In the base part of the next phase, which is not shown in the figures, solenoid valves 76D and 84A are open while all the other six solenoid valves are closed. In the extended part of this phase only solenoid valves 76D and 84D are open.

The heating and cooling of the chambers is continued in a series fashion through all the chambers and by opening only the identified solenoid valves and heating of the heat transfer fluid in one of lines 78A, 78B, 78C or 78D, by an external burner in the following manner:

| Phase | Base Part<br>Opened Valves - "On" Burner | | Extended Part<br>Opened Valves |
|---|---|---|---|
| 1 | 76A, 84B | 93C | 76A, 84A |
| 2 | 76D, 84A | 93B | 76D, 84D |
| 3 | 76C, 84D | 93A | 76C, 84C |
| 4 | 76B, 84C | 93D | 76B, 84B |

Figure 4:
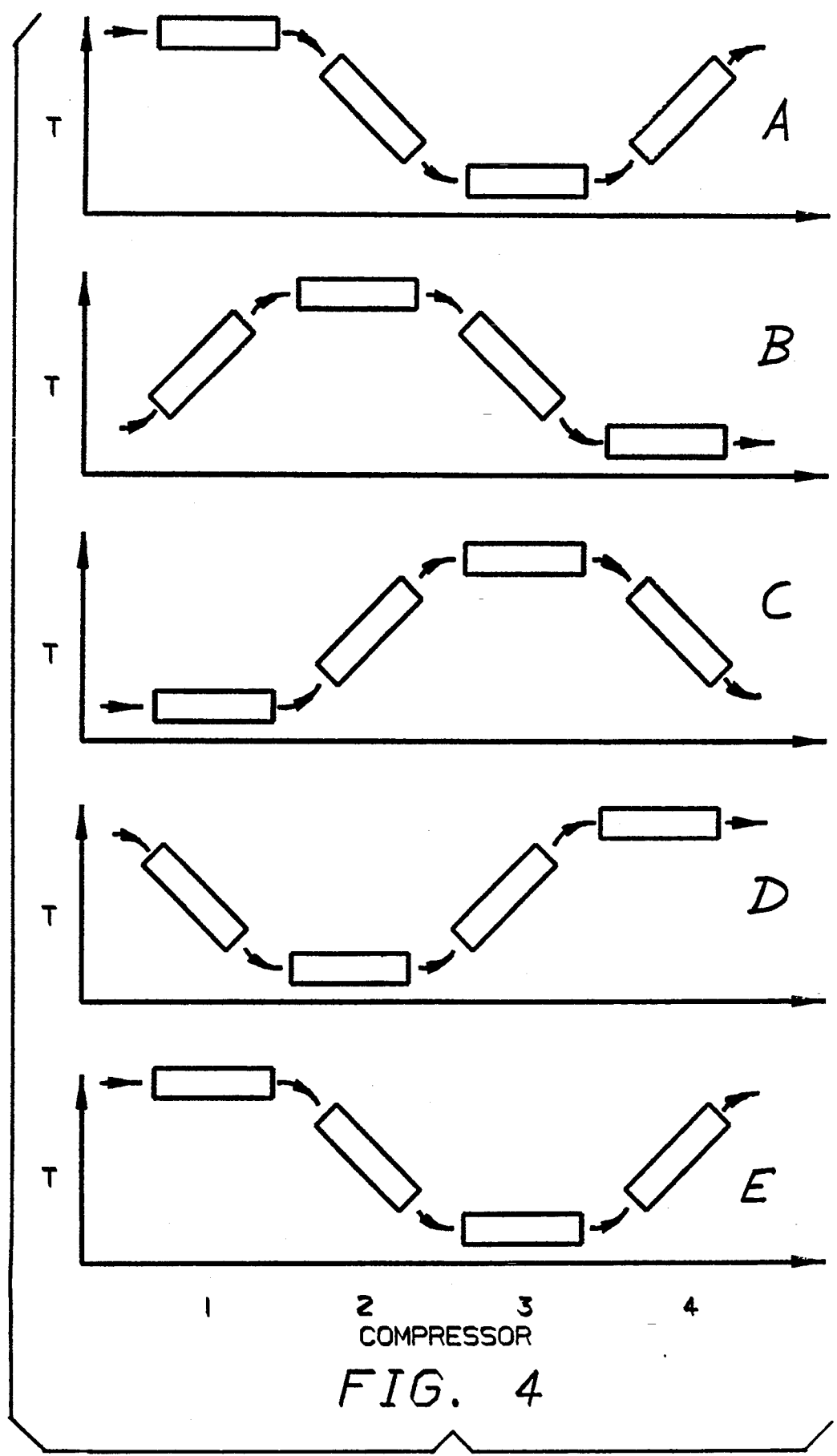
FIG. 4 is an illustration of the regenerative thermal wave experienced in each compressor of each stage for a system having four compressors per stage.

The thermal wave temperature profiles of the compressors in FIGS. 2 and 3 reading bottom to top are shown approximately in FIG. 4 left to right. Profiles A, B, C, D, and E of FIG. 4 correspond to phases 4, 1, 2, 3, and 4, respectively.

Figure 5:
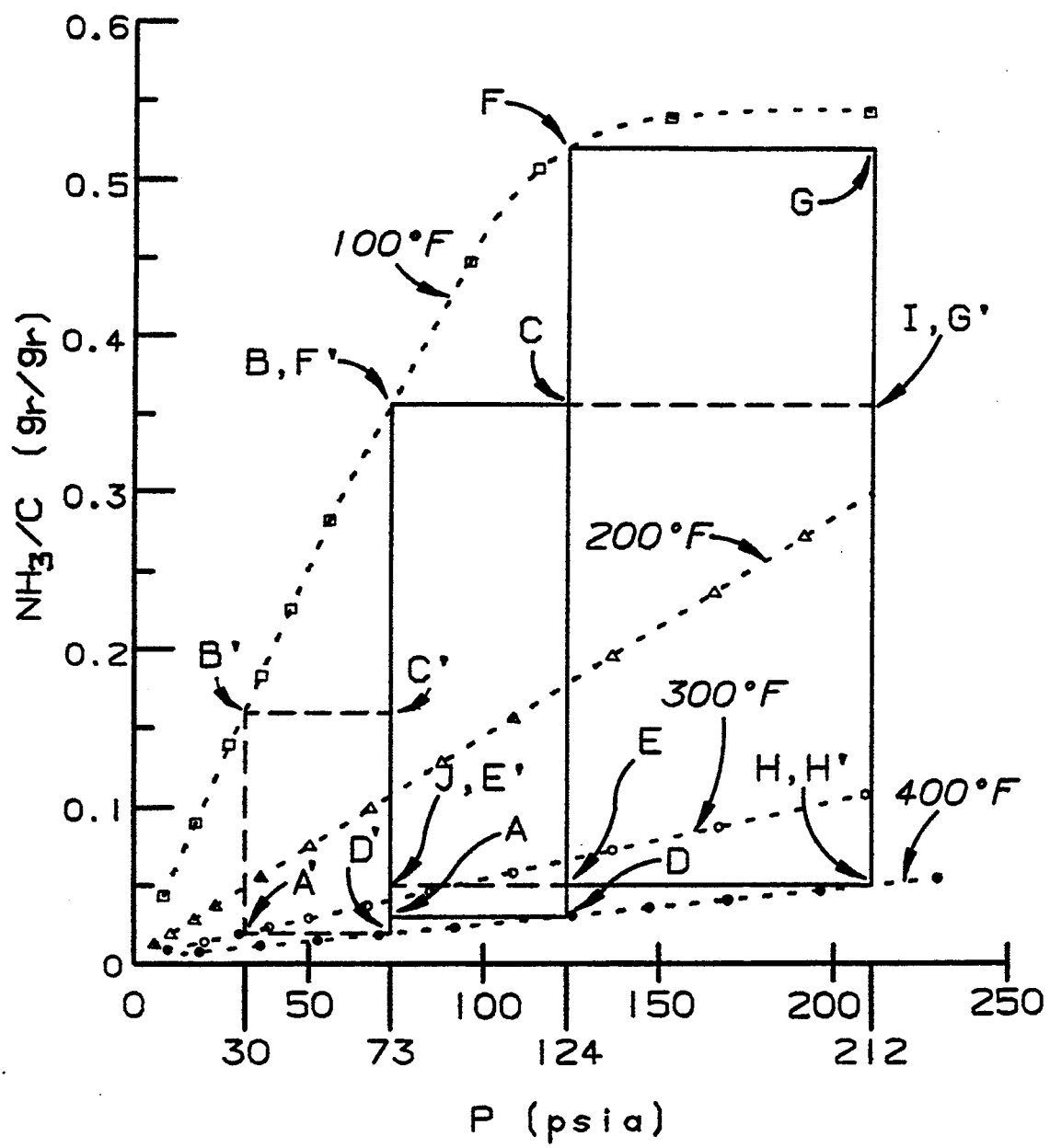
FIG. 5 is a schematic diagram comparison of a one stage compression process and a two stage compression process for ammonia-carbon system.

The first stage and second stage compression zone cycles are depicted in FIG. 5, wherein the first stage cycle is represented by the solid-line rectangle ABCD and the second stage cycle is represented by the solid-line rectangle EFGH. Isotherm curves are shown for 100°, 200°, 300° and 400° F. The vertical difference between points B and D, and F and H, represents the grams of ammonia desorbed per gram of carbon adsorbent. Points B and F lay on the 100° F. isotherm, and points D and H lay on the 400° F. isotherm. For example, in one embodiment the ratio $M_2/M_1$ is adjusted to a predetermined value which is approximately equal to $(C_B - C_D)/(C_F - C_H)$ where:

$M_1$ is the amount of carbon in the first stage compression zones, $M_2$ is the amount of carbon in the second stage compression zones, $C_B$ is the adsorptive capacity of carbon for ammonia at point B, $C_D$ is the adsorptive capacity of carbon for ammonia at point D, $C_F$ is the adsorptive capacity of carbon for ammonia at point F, and $C_H$ is the adsorptive capacity of carbon for ammonia at point H.

In the example represented by FIG. 5, the ratio $$M_2/M_1 = [0.3688 - 0.0268] \div [0.5202 - 0.0441] = 0.72$$

Thus the first stage compressors are about 39% larger than the second stage compressors.

Referring still to FIG. 5, the advantage of a two stage compression system can be shown by comparing the single stage represented by the rectangle JBIH to the two stage system represented by the first stage rectangle ABCD and the second stage rectangle EFGH. For the single stage system operating over the cycle JBIH and having eight compression zones, the ammonia is compressed from 73 to 212 psia. The cooling COP or $COP_C$ for this cycle has been calculated to be about 1.0. In the heating mode the heating COP or $COP_H$ has been calculated to be about 2.0.

By changing the system to the that shown in FIG. 1 with four first stage compression zones operating over the cycle ABCD and four second stage compression zones operating over the cycle EFGH the amount of high pressure ammonia gas produced is about 50% higher than that of the one stage system, which results in a calculated $COP_C$ of about 1.2 and a calculated $COP_H$ of about 2.2 which are significantly higher than that realized in the one stage eight compression zones system.

Figure 6:
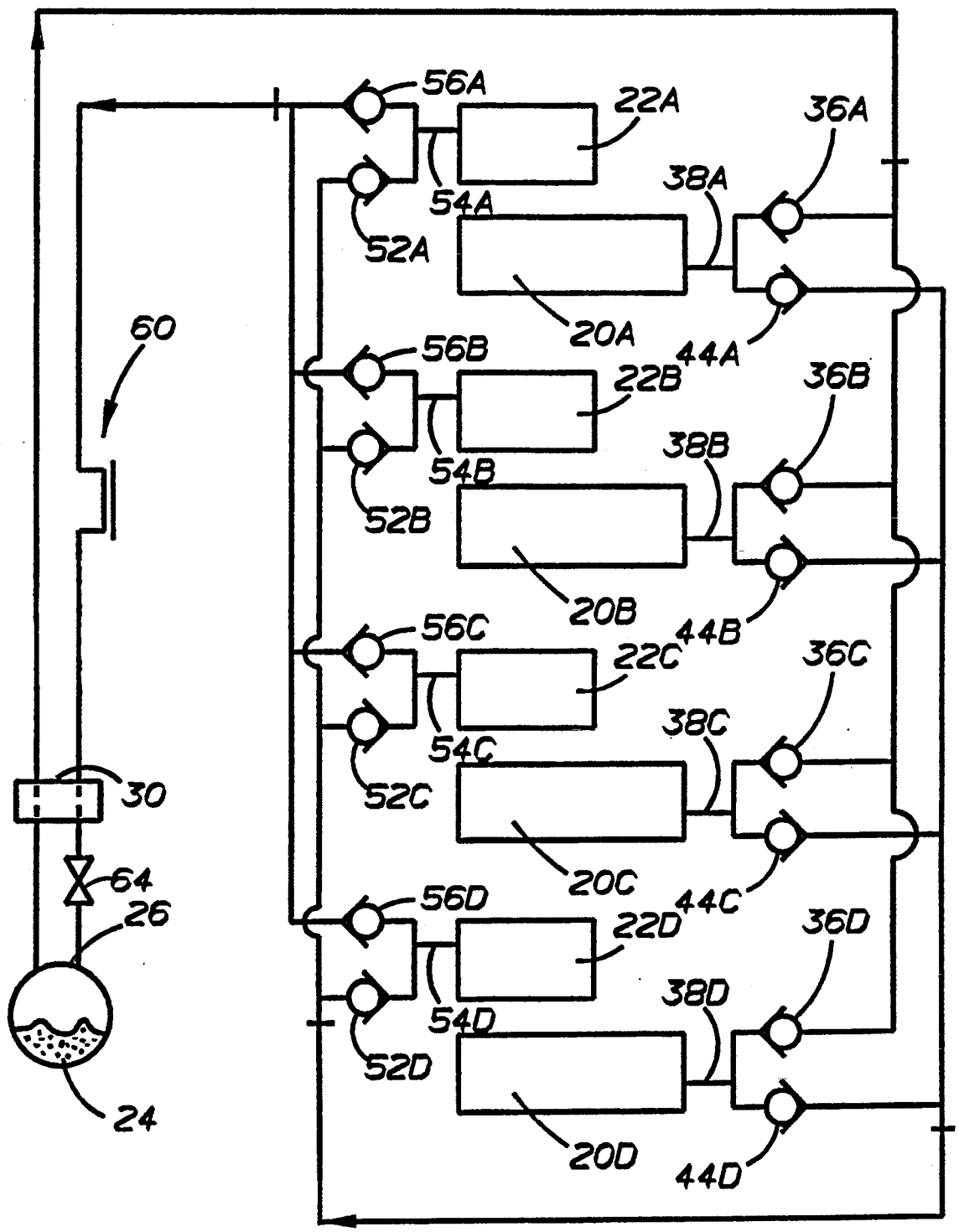
FIG. 6 is a schematic diagram of a two stage compression series/parallel regenerative heat pump process having four first stage and four second stage compression zones showing the working fluid circuit.

FIG. 6 is a schematic diagram showing the working fluid circuit of another embodiment of this invention for a two stage compression regenerative heat pump process also having four first stage and four second stage compression zones. In this embodiment the first stage and second stage compression zones are housed in separate vessels spaced apart from each other. The working fluid circuit, however, is the same as that for FIG. 1. As in FIG. 1, the heat transfer fluid circuit is not shown.

Figure 7:
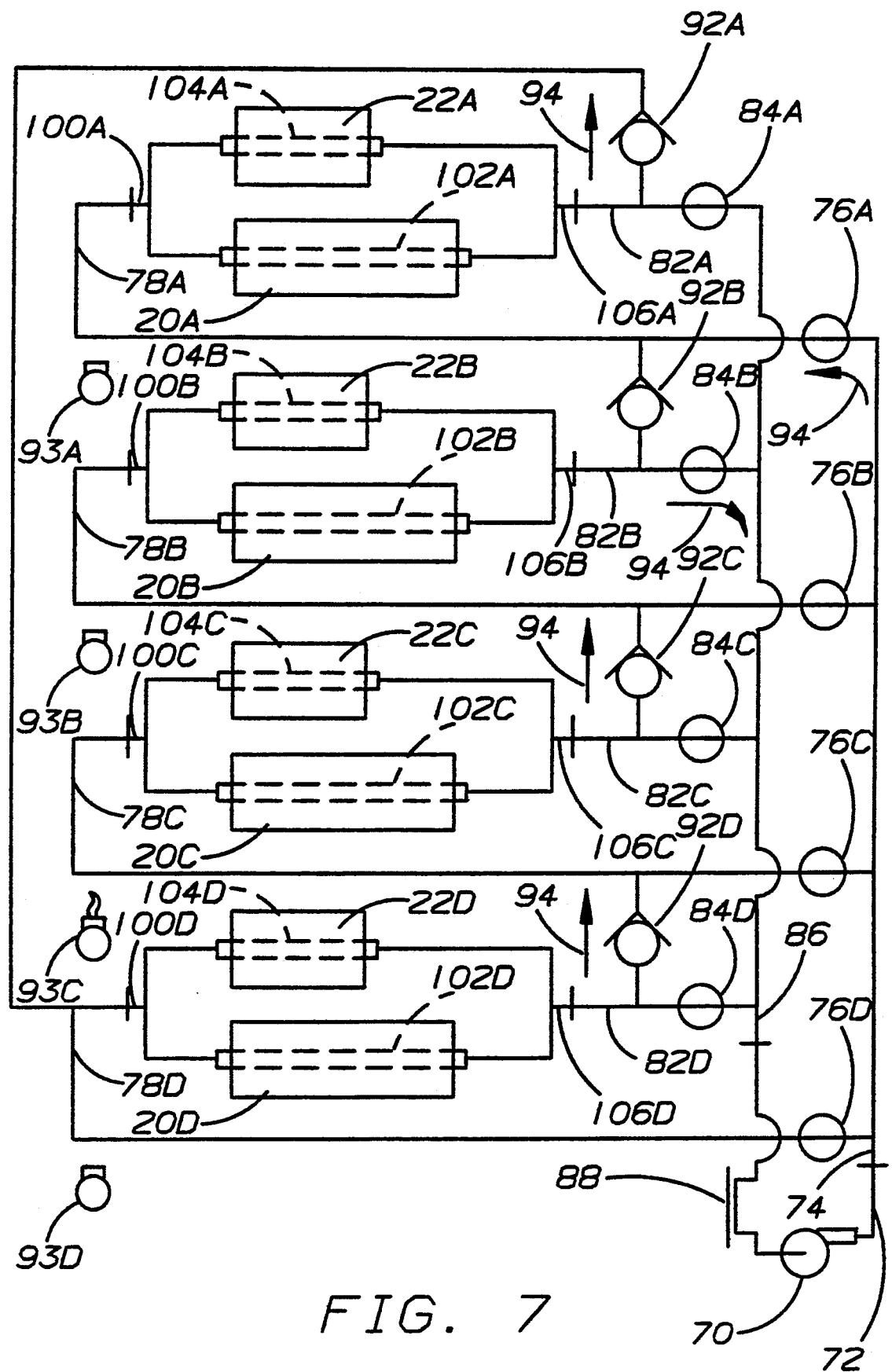
FIG. 7 is a schematic diagram showing the regenerative heat transfer fluid circuit for the system of FIG. 6.

FIG. 7 is a schematic diagram showing the regenerative heat transfer fluid circuit for the system of FIG. 6. The working fluid circuit of FIG. 6 is not shown in FIG. 7. FIG. 7 is similar to FIG. 2 except that in FIG. 7 the heat transfer fluid flows through a pair of first stage and second stage compression zones in parallel rather than in series as in FIG. 2. Specifically, in FIG. 7 lines 78A, 78B, 78C and 78D are connected to inlet manifolds 100A, 100B, 100C and 100D, respectively, which are connected to internal heat transfer conduit pairs 102A and 104A, 102B and 104B, 102C and 104C, and 102D and 104D, respectively, which are connected to outlet manifolds 106A, 106B, 106C and 106D, respectively, which are connected to outlet lines 82A, 82B, 82C and 82D, respectively. The remainder of the heat transfer fluid circuit is the same as that shown in FIG. 2. FIG. 7 involves the base part of the same phase as that shown in FIG. 2. The flow in the extended part of this phase, i.e. the bottoming phase, will be similar to that shown in FIG. 3 except for the parallel flow of the heat transfer fluid through the pair of first stage and second stage compression zones.

Figure 8:
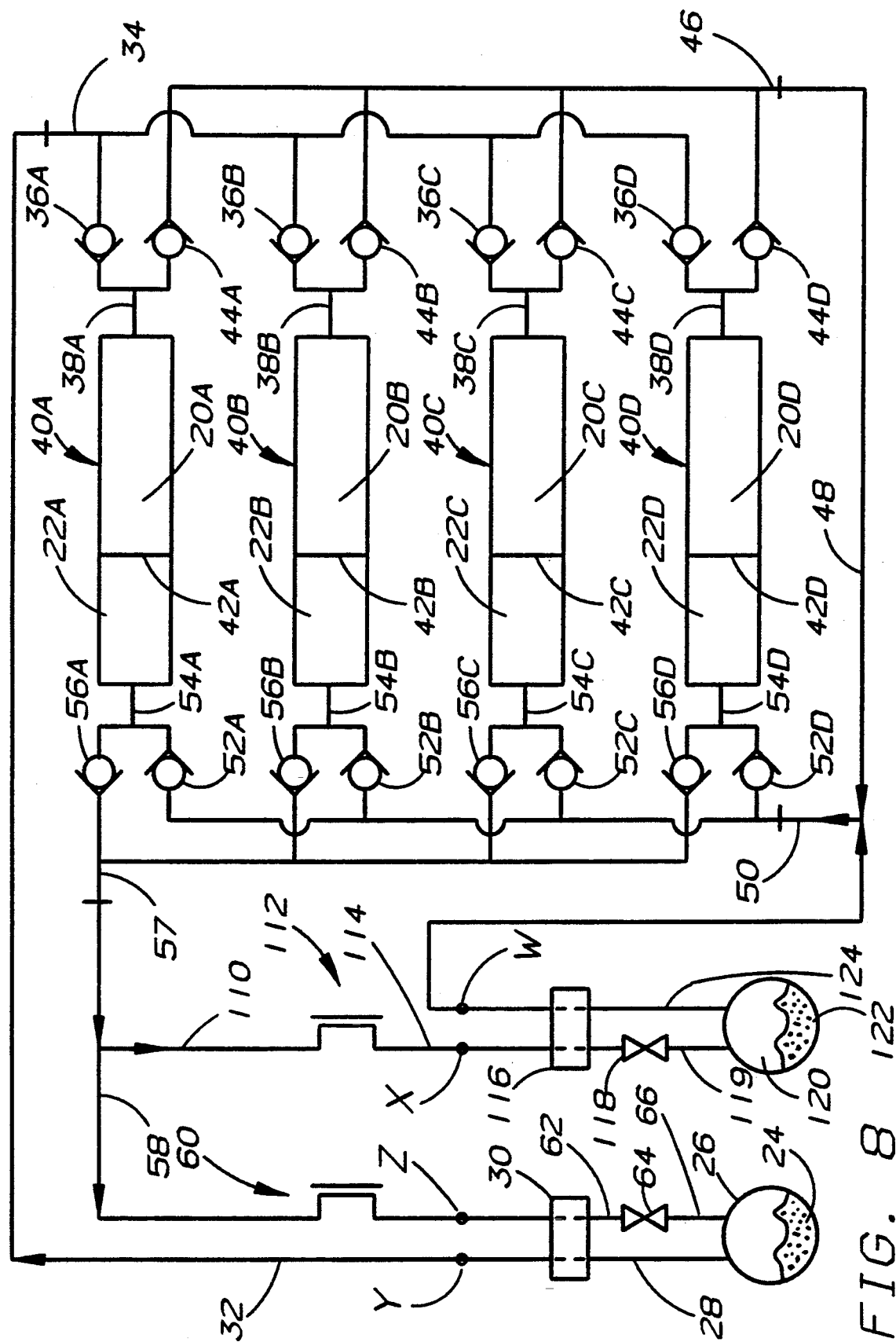
FIG. 8 is a schematic diagram of a two stage compression series/series regenerative heat pump process for cooling a refrigeration space and a freezer space having four first stage and four second stage compression zones showing the working fluid circuit.

FIG. 8 is a schematic diagram showing the working fluid circuit for a two stage compression series/series regenerative heat pump process for cooling a refrigeration space and a freezer space. FIG. 8 also has four first stage and four second stage compression zones. The working fluid circuit for the system of FIG. 8 is the same as that for the system of FIG. 1 except for the addition of a second evaporator circuit. As shown in FIG. 8, branching off of line 57 is line 110, which is connected to condenser 112, which is connected to line 114. Line 114 is in heat transfer communication with the heat exchanger 116. Line 114 is connected to expansion valve 118, which is connected to line 119, which is connected to evaporator 120.

Evaporator 120 contains a supply of liquid working fluid 122, which in this embodiment is ammonia. Evaporator 120 receives heat from a refrigerator zone thereby cooling the refrigerator zone. Ammonia vapor flows from evaporator 120 to line 124 which is in heat transfer communication with line 114 in heat exchanger 116. Line 124 is connected to line 48, which delivers ammonia vapor to the second stage compression zones at $P_M$, thereby forming a second closed working fluid loop. The heat transfer fluid circuit for the system of FIG. 8 is the same as that for the system of FIG. 1, namely that shown in FIGS. 2 and 3.

Figure 9:
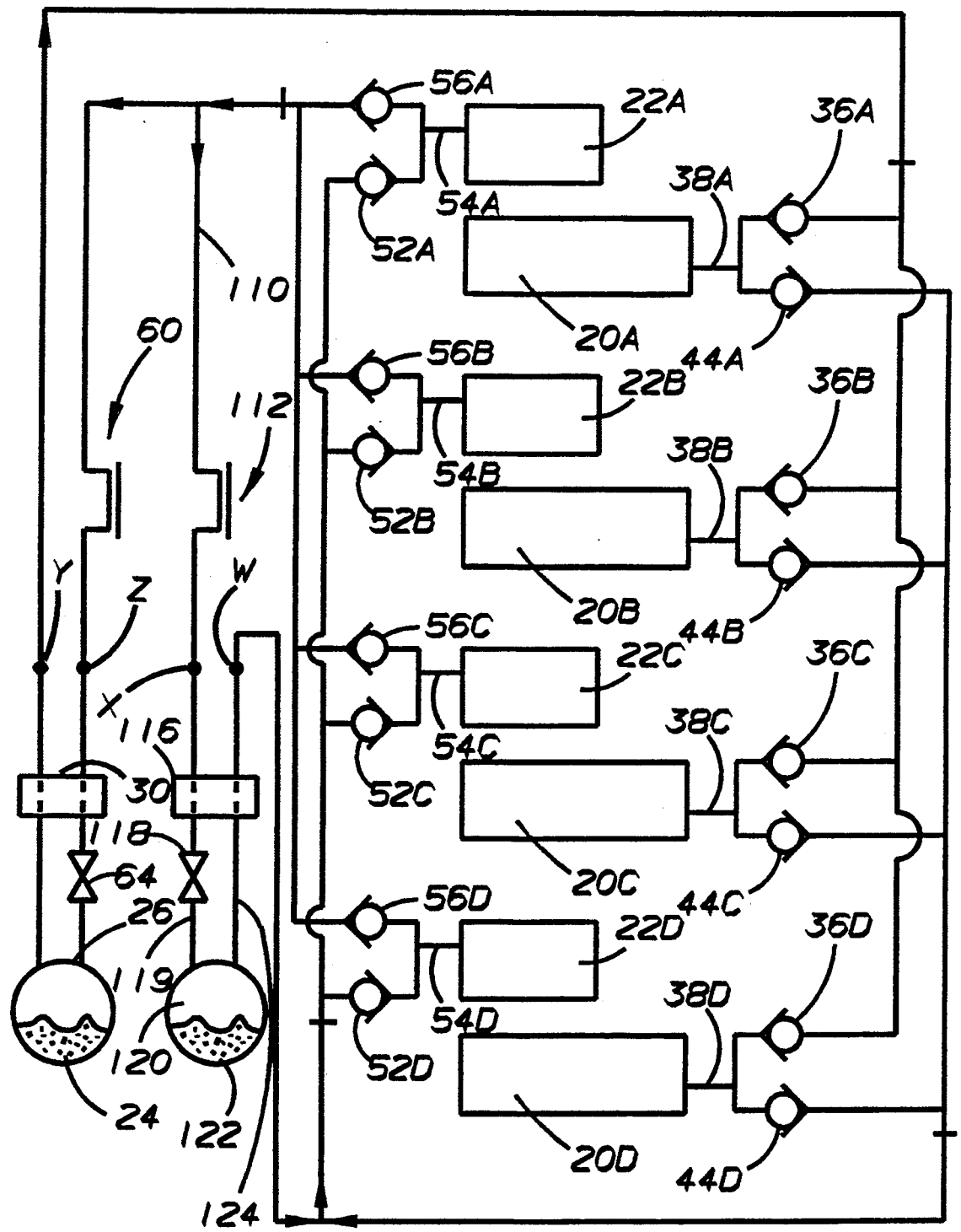
FIG. 9 is a schematic diagram of a two stage compression series/parallel regenerative heat pump process for cooling a refrigeration space and a freezer space having four first stage and four second stage compression zones showing the working fluid circuit.

FIG. 9 is a schematic diagram showing the working fluid circuit of another embodiment of this embodiment for a two stage compression regenerative heat pump process for a refrigerator/freezer system also having four first stage and four second stage compression zones. However, in this embodiment the first stage and second stage compression zones are housed in separate vessels from each other. The heat transfer fluid circuit for the system of FIG. 9 is similar to that described for the system of FIG. 6 for which the base part of one phase is shown in FIG. 7.

The embodiments shown in the systems of FIGS. 8 and 9 use carbon as the sorbent and ammonia as the working fluid. The first stage compression zones operate over a pressure range from about 30 psia or $P_L$ to about 73 psia or $P_M$, and the second stage compression zones operate over a pressure range from about 73 psia or $P_M$ to about 212 psia or $P_H$.

Evaporator 26, which contains a supply of liquid ammonia 24, receives heat from a freezer zone thereby cooling the freezer zone. Liquid ammonia is vaporized and the vapor flows from evaporator 26 through line 32, which is connected to manifold 34 which delivers ammonia vapor to the first stage compression zones at pressure $P_L$.

For the two stage, two evaporator zone, freezer/refrigerator system of FIGS. 8 and 9, the first stage and second stage compression zone cycles are also depicted in FIG. 5. The first stage cycle is represented by the dash-line rectangle A'B'C'D'. The second stage cycle is represented by the dash-line rectangle E'F'G'H'. Points B' and F' lay on the 100° F. isotherm, and points D' and H' lay on the 400° F. isotherm. The prime mark is used merely to distinguish points on FIG. 5 over the earlier example. The vertical differences between points B' and D', and F' and H', represents the grams of ammonia desorbed per gram of carbon adsorbent in each stage. For example, in one embodiment the ratio $M_2/M_1$ is adjusted to a predetermined value which is approximately equal to:

$$\left[\frac{C_{B'} - C_{D'}}{C_{F'} - C_{H'}}\right] \cdot \left[\left(\frac{Q_{R'}}{Q_F} \cdot \frac{H_Y - H_Z}{H_W - H_X}\right) + 1\right]$$

where:
$M_1$ is the amount of carbon in the first stage compression zones,
$M_2$ is the amount of carbon in the second stage compression zones,
$C_{B'}$ is the adsorptive capacity of carbon for ammonia at point B',
$C_{D'}$ is the adsorptive capacity of carbon for ammonia at point D',
$C_{F'}$ is the adsorptive capacity of carbon for ammonia at point F',
$C_{H'}$ is the adsorptive capacity of carbon for ammonia at point H',
$H_W$ is ammonia enthalpy at point W of FIG. 8,
$H_X$ is ammonia enthalpy at point X of FIG. 8,
$H_Y$ is ammonia enthalpy at point Y of FIG. 8,
$H_Z$ is ammonia enthalpy at point Z of FIG. 8,
$Q_R$ is the heat load in the refrigerator, and
$Q_F$ is the heat load in the freezer.

For the two stage system represented by the dashed lines in FIG. 5, and for a predetermined design $Q_R/Q_F$ ratio of 0.85, then $$\frac{M_2}{M_1} = \left[\frac{0.1593 - 0.0158}{0.3688 - 0.0441}\right] \cdot \left[\left(0.85 \cdot \frac{643.8 - 155.2}{637.4 - 155.2}\right) + 1\right]$$

or $M_2/M_1 = 0.82$. Thus the first stage compressors are about 22% larger than the second stage compressors.

In other embodiments condensers 60 and 112 can be replaced by a single and larger condenser located after manifold 57 and upstream of line 110.

In another alternate embodiment the refrigeration zone is cooled by the freezer zone and only one working fluid circuit is required as shown in FIGS. 1 and 6. In this case $M_2/M_1$ would be approximately 0.44. In this case the first stage compressors are about 126% larger than the second stage compressors.

Referring to FIG. 2, solenoid valves 76A, 76B, 76C, 76D, 84A, 84B, 84C and 84D, are controlled by controller means 130 so that only one of valve series 76A, 76B, 76C and 76D, and only one of valve series 84A, 84B, 84C and 84D, are open during the base part of each phase. Controller means 130 opens the valves for a predetermined period of time. Controller means 130 also controls external heating means or natural gas burners 93A, 93B, 93C and 93D so that only one of them is heating the heat transfer fluid for a predetermined period of time during the base part of each phase. Controller means 130 also prevents any burner from heating the heat transfer fluid during the extended or bottoming part of any phase. Since the controller means for the embodiments shown in FIGS. 7, 8 and 9 is the same as that shown in FIG. 2, the controller means has not been shown in FIGS. 7, 8 and 9.

In one embodiment the heat transfer fluid enters each first stage compression zone and then flows into the corresponding second stage compression zone.

Heating means 93A, 93B, 93C and 93D can be oil heat or any other heat source desired.

Other working fluids/sorbents can be used besides ammonia/carbon and the cycle adjusted as required to produce the desired cooling and heating temperature.

While the preferred embodiments of the present invention have been described, it should be understood that various changes, adaptations and modifications may be made thereto without departing from the spirit of the invention and the scope of the appended claims. It should be understood, therefore, that the invention is not to be limited to minor details of the illustrated invention shown in preferred embodiment and the figures, and that variations in such minor details will be apparent to one skilled in the art.

Therefore it is to be understood that the present disclosure and embodiments of this invention described herein are for purposes of illustration and example and that modifications and improvements may be made thereto without departing from the spirit of the invention or from the scope of the claims. The claims, therefore, are to be accorded a range of equivalents commensurate in scope with the advances made over the art.

What is claimed is:

1. A regenerative sorbent heat pump process for cooling and heating an interior space comprising:
   (a) providing a working fluid;
   (b) confining a sorbent for the working fluid in a plurality of compressor zones, the number of compressor zones being at least eight, at least four of the compressor zones being included in a first stage operating over a first pressure region, and at least four of the compressor zones being included in a second stage operating over a second pressure region which is different and higher than the first pressure region;
   (c) introducing the working fluid vapor from an evaporation zone into at least one of the first stage compressor zones and sorbing the working fluid vapor on the sorbent therein at a predetermined first pressure $P_L$, and
   desorbing the working fluid vapor from the sorbent in at least one of the second stage compressor zones and removing working fluid vapor therefrom at a predetermined second pressure $P_H$ which is higher than $P_L$;
   (d) desorbing the working fluid vapor from the sorbent in at least one of the first stage compressor zones at a predetermined third pressure $P_M$ which is higher than $P_L$ but lower than $P_H$, and
   introducing the desorbed working fluid vapor therefrom into at least one of the second stage compressor zones and sorbing the working fluid vapor on the sorbent therein at a pressure of about $P_M$;
   (e) minimizing the thermal capacitance differences between the first stage compression zones;
   (f) minimizing the thermal capacitance differences between the second stage compression zones;
   (g) condensing working fluid vapor removed from the second stage compressor zone at a pressure of about $P_H$ and transferring heat from the working fluid to the environment when cooling an interior space, or to the interior space when heating the interior space, thereby forming a working fluid liquid;
   (h) expanding and evaporating the working fluid liquid and forming the working fluid vapor in the evaporation zone at a pressure of about $P_L$ by transferring heat from the interior space when cooling the interior space, or from the environment when heating the interior space, to the evaporation zone thereby cooling or heating the interior space;
   (i) circulating a heat transfer fluid in a closed loop which comprises a heat removal zone and the first stage and second stage compressor zones while preventing the heat transfer fluid from directly contacting the sorbent;
   (j) transferring heat from the heat transfer fluid in the heat removal zone to the environment;
   (k) adding heat from a heat source over a predetermined period of time to the first stage compressor zone which is desorbing the working fluid vapor at $P_M$;
   (l) adding heat from a heat source over a predetermined period of time to the second stage compressor zone which is desorbing the working fluid vapor at $P_H$;
   (m) transferring heat from the sorbent in the compressor zones which are sorbing working fluid vapor to the heat transfer fluid, and from the heat transfer fluid to the sorbent in the compressor zones which are desorbing working fluid vapor thereby regenerating heat;
   (n) repeating the steps sequentially in each of the other first and second stage compressor zones;
   (o) wherein the amount of sorbent in the first stage compression zones is $M_1$, the amount of sorbent in the second stage compression zones is $M_2$, and adjusting the ratio $M_2/M_1$ to a predetermined value which is approximately equal to $(C_B - C_D)/(C_F - C_H)$, wherein the adsorptive capacity of the sorbent for the working fluid at $P_L$ and the lowest temperature in the first stage compression zones is $C_B$, the adsorptive capacity of the sorbent for the working fluid at $P_M$ and the highest temperature in the first stage compression zones is $C_D$, the adsorptive capacity of the sorbent for the working fluid at $P_M$ and the lowest temperature in the second stage compression zones is $C_F$, the adsorptive capacity of the sorbent for the working fluid at $P_H$ and the highest temperature in the second stage compression zones is $C_H$; and
   (p) maintaining the $P_H/P_M$ ratio approximately equal to the $P_M/P_L$ ratio.

2. The process of claim 1, wherein minimizing the thermal capacitance differences of the compression zones comprises equalizing the thermal capacitance of the first stage compression zones to each other, and equalizing the thermal capacitance of the second stage compression zones to each other.

3. The process of claim 1, further comprising maintaining the $P_H/P_M$ ratio between about 1.1 and about 5, and maintaining the $P_M/P_L$ ratio between about 1.1 and about 5.

4. The process of claim 1, further comprising maintaining the $P_H/P_M$ ratio between about 1.5 and about 2, and maintaining the $P_M/P_L$ ratio between about 1.5 and about 2.

5. The process of claim 1, further comprising maintaining the $P_H/P_M$ ratio at about 1.7, and maintaining the $P_M/P_L$ ratio at about 1.7.

6. The process of claim 1, wherein the working fluid is ammonia, the sorbent is carbon, $P_L$ is from about 20 to about 100 psia, $P_M$ is from about 75 to about 175 psia, and $P_H$ is from about 150 to about 300 psia.

7. The process of claim 1, wherein the working fluid is ammonia, the sorbent is carbon, $P_L$ is about 73 psia, $P_M$ is about 124 psia, and $P_H$ is about 212 psia.

8. The process of claim 1, wherein the number of second stage compression zones is equal to the number of first stage compression zones.

9. A regenerative sorbent heat pump process for cooling and heating an interior space comprising:

(a) providing a working fluid;
   (b) confining a sorbent for the working fluid in a plurality of compressor zones, the number of compressor zones being at least eight, at least four of the compressor zones being included in a first stage operating over a first pressure region, and at least four of the compressor zones being included in a second stage operating over a second pressure region which is different and higher than the first pressure region;
   (c) introducing the working fluid vapor from an evaporation zone into at least one of the first stage compressor zones and sorbing the working fluid vapor on the sorbent therein at a predetermined first pressure $P_L$, and
   desorbing the working fluid vapor from the sorbent in at least one of the second stage compressor zones and removing working fluid vapor therefrom at a predetermined second pressure $P_H$ which is higher than $P_L$;
   (d) desorbing the working fluid vapor from the sorbent in at least one of the first stage compressor zones at a predetermined third pressure $P_M$ which is higher than $P_L$ but lower than $P_H$, and
   introducing the desorbed working fluid vapor therefrom into at least one of the second stage compressor zones and sorbing the working fluid vapor on the sorbent therein at a pressure of about $P_M$;
   (e) minimizing the thermal capacitance differences between the first stage compression zones;
   (f) minimizing the thermal capacitance differences between the second stage compression zones;
   (g) condensing working fluid vapor removed from the second stage compressor zone at a pressure of about $P_H$ and transferring heat from the working fluid to the environment when cooling an interior space, or to the interior space when heating the interior space, thereby forming a working fluid liquid;
   (h) expanding and evaporating the working fluid liquid and forming the working fluid vapor in the evaporation zone at a pressure of about $P_L$ by transferring heat from the interior space when cooling the interior space, or from the environment when heating the interior space, to the evaporation zone thereby cooling or heating the interior space;
   (i) circulating a heat transfer fluid in a closed loop which comprises a heat removal zone and the first stage and second stage compressor zones while preventing the heat transfer fluid from directly contacting the sorbent;
   (j) transferring heat from the heat transfer fluid in the heat removal zone to the environment;
   (k) adding heat from a heat source over a predetermined period of time to the first stage compressor zone which is desorbing the working fluid vapor at $P_M$;
   (l) cooling the coolest compressor in the first stage to a predetermined first stage bottoming temperature;
   (m) adding heat from a heat source over a predetermined period of time to the second stage compressor zone which is desorbing the working fluid vapor at $P_H$;
   (n) cooling the coolest compressor in the second stage to a predetermined second stage bottoming temperature;
   (o) transferring heat from the sorbent in the compressor zones which are sorbing working fluid vapor to the heat transfer fluid, and from the heat transfer fluid to the sorbent in the compressor zones which are desorbing working fluid vapor thereby regenerating heat;
   (p) repeating the steps sequentially in each of the other first and second stage compressor zones;
   (q) wherein the amount of sorbent in the first stage compression zones is $M_1$, the amount of sorbent in the second stage compression zones is $M_2$, and adjusting the ratio $M_2/M_1$ to a predetermined value which is approximately equal to $(C_B - C_D)/(C_F - C_H)$, wherein the adsorptive capacity of the sorbent for the working fluid at $P_L$ and the lowest temperature in the first stage compression zones is $C_B$, the adsorptive capacity of the sorbent for the working fluid at $P_M$ and the highest temperature in the first stage compression zones is $C_D$, the adsorptive capacity of the sorbent for the working fluid at $P_M$ and the lowest temperature in the second stage compression zones is $C_F$, the adsorptive capacity of the sorbent for the working fluid at $P_H$ and the highest temperature in the second stage compression zones is $C_H$; and
   (r) maintaining the $P_H/P_M$ ratio approximately equal to the $P_M/P_L$ ratio.

10. The process of claim 9, wherein cooling the coolest compressor in the first stage to a predetermined first stage bottoming temperature comprises circulating the heat transfer fluid in a closed loop which comprises the heat removal zone and the coolest first stage compressor zone but not the other first stage compressor zones.

11. The process of claim 9, wherein cooling the coolest compressor in the second stage to a predetermined second stage bottoming temperature comprises circulating the heat transfer fluid in a closed loop which comprises the heat removal zone and the coolest second stage compressor zone but not the other second stage compressor zones.

12. The process of claim 9, wherein cooling the coolest compressor in the first stage to a predetermined first stage bottoming temperature and cooling the coolest compressor in the second stage to a predetermined second stage bottoming temperature comprises circulating the heat transfer fluid in a second closed loop which comprises the heat removal zone, the coolest first stage compressor zone and the coolest second stage compressor zone but not the other first stage compressor zones nor the other second stage compressor zones.

13. The process of claim 9, wherein cooling the coolest compressor in the first stage to a predetermined first stage bottoming temperature and cooling the coolest compressor in the second stage to a predetermined second stage bottoming temperature further comprises circulating the heat transfer fluid in the second closed loop from the heat removal zone to the coolest first stage compressor zone, from the coolest first stage compression zone to the coolest second stage compressor zone, and from the coolest second stage compression zone to the heat removal zone.

14. The process of claim 9, wherein cooling the coolest compressor in the first stage to a predetermined first stage bottoming temperature and cooling the coolest compressor in the second stage to a predetermined second stage bottoming temperature further comprises circulating the heat transfer fluid in the second closed loop from the heat removal zone to a parallel circuit of the coolest first stage compressor zone and the coolest second stage compressor zone, and from the parallel circuit to the heat removal zone.

15. The process of claim 9, wherein the predetermined second stage bottoming temperature is about equal to the predetermined first stage bottoming temperature.

16. The process of claim 9, wherein the working fluid is ammonia, the sorbent is carbon, $P_L$ is from about 20 to about 100 psia, $P_M$ is from about 75 to about 175 psia, and $P_H$ is from about 150 to about 300 psia.

17. The process of claim 9, wherein the working fluid is ammonia, the sorbent is carbon, $P_L$ is about 73 psia, $P_M$ is about 124 psia, $P_H$ is about 212 psia, and wherein the predetermined first stage bottoming temperature and the predetermined second stage bottoming temperature are from about 70° to about 150° F.

18. A regenerative sorbent heat pump process for cooling a refrigeration space and a freezer space comprising:
   (a) providing a working fluid;
   (b) confining a sorbent for the working fluid in a plurality of compressor zones, the number of compressor zones being at least eight, at least four of the compressor zones being included in a first stage operating over a first pressure region, and at least four of the compressor zones being included in a second stage operating over a second pressure region which is different and higher than the first pressure region;
   (c) introducing the working fluid vapor from a freezer evaporation zone into at least one of the first stage compressor zones and sorbing the working fluid vapor on the sorbent therein at a predetermined first pressure $P_L$, and desorbing the working fluid vapor from the sorbent in at least one of the second stage compressor zones and removing working fluid vapor therefrom at a predetermined second pressure $P_H$ which is higher than $P_L$;
   (d) desorbing the working fluid vapor from the sorbent in at least one of the first stage compressor zones at a predetermined third pressure $P_M$ which is higher than $P_L$ but lower than $P_H$;
   (e) introducing
      (i.) the desorbed working fluid vapor at $P_M$, and
      (ii.) an additional amount of working fluid vapor from a refrigeration evaporation zone,
   into at least one of the second stage compressor zones and sorbing the working fluid vapor on the sorbent therein at a pressure of about $P_M$;
   (f) minimizing the thermal capacitance differences between the first stage compression zones;
   (g) minimizing the thermal capacitance differences between the second stage compression zones;
   (h) condensing working fluid vapor removed from the second stage compressor zone at a pressure of about $P_H$ and transferring heat from the working fluid to the environment thereby forming a working fluid liquid;
   (i) expanding a first portion of the working fluid liquid, and evaporating it in the freezer evaporation zone at a pressure of about $P_L$ by transferring heat from a freezer space to the freezer evaporation zone thereby cooling the freezer space;
   (j) expanding a second portion of the working fluid liquid, and evaporating it in the refrigeration evaporation zone at a pressure of about $P_M$ by transferring heat from a refrigeration space to the refrigeration evaporation zone thereby cooling the refrigeration space and forming the additional amount of working fluid vapor;
   (k) circulating a heat transfer fluid in a closed loop which comprises a heat removal zone and the first stage and second stage compressor zones while preventing the heat transfer fluid from directly contacting the sorbent;
   (l) transferring heat from the heat transfer fluid in the heat removal zone to the environment;
   (m) adding heat from a heat source over a predetermined period of time to the first stage compressor zone which is desorbing the working fluid vapor at $P_M$;
   (n) adding heat from a heat source over a predetermined period of time to the second stage compressor zone which is desorbing the working fluid vapor at $P_H$;
   (o) transferring heat from the sorbent in the compressor zones which are sorbing working fluid vapor to the heat transfer fluid, and from the heat transfer fluid to the sorbent in the compressor zones which are desorbing working fluid vapor thereby regenerating heat;
   (p) repeating the steps sequentially in each of the other first and second stage compressor zones; and
   (q) wherein the amount of sorbent in the first stage compression zones is $M_1$, the amount of sorbent in the second stage compression zones is $M_2$, and adjusting the ratio $M_2/M_1$ to a predetermined value which is approximately equal to $$\left[ \frac{(C_B - C_D)}{(C_F - C_H)} \right] \cdot \left[ \left( \frac{Q_R}{Q_F} \cdot \frac{H_Y - H_Z}{H_W - H_X} \right) + 1 \right]$$

wherein the adsorptive capacity of the sorbent for the working fluid at $P_L$ and the lowest temperature in the first stage compression zones is $C_B$, the adsorptive capacity of the sorbent for the working fluid at $P_M$ and the highest temperature in the first stage compression zones is $C_D$, the adsorptive capacity of the sorbent for the working fluid at $P_M$ and the lowest temperature in the second stage compression zones is $C_F$, the adsorptive capacity of the sorbent for the working fluid at $P_H$ and the highest temperature in the second stage compression zones is $C_H$, the enthalpy of the second portion of the working fluid liquid after its condensation and before its expansion is $H_X$, the enthalpy of the heated freezer working fluid vapor is $H_Y$, the enthalpy of the heated refrigerator working fluid vapor is $H_W$, the enthalpy of the first portion of the working fluid liquid after its condensation and before its expansion is $H_Z$, a predetermined design heat load in the refrigerator is $Q_R$, and a predetermined design heat load in the freezer is $Q_F$.

19. The process of claim 18, wherein minimizing the thermal capacitance differences of the compression zones comprises equalizing the thermal capacitance of the first stage compression zones to each other, and equalizing the thermal capacitance of the second stage compression zones to each other.

20. The process of claim 18, further comprising maintaining the $P_H/P_M$ ratio between about 1.5 and about 2, and maintaining the $P_M/P_L$ ratio between about 1.5 and about 2.

21. The process of claim 18, wherein the working fluid is ammonia, the sorbent is carbon, $P_L$ is from about 10 to about 40 psia, $P_M$ is from about 40 to about 90 psia, and $P_H$ is from about 150 to about 300 psia.

22. The process of claim 18, wherein the working fluid is ammonia, the sorbent is carbon, $P_L$ is about 30 psia, $P_M$ is about 73 psia, and $P_H$ is about 212 psia.

23. The process of claim 18, wherein the number of second stage compression zones is equal to the number of first stage compression zones.

24. A regenerative sorbent heat pump process for cooling a refrigeration space and a freezer space comprising:

(a) providing a working fluid;

(b) confining a sorbent for the working fluid in a plurality of compressor zones, the number of compressor zones being at least eight, at least four of the compressor zones being included in a first stage operating over a first pressure region, and at least four of the compressor zones being included in a second stage operating over a second pressure region which is different and higher than the first pressure region;

(c) introducing the working fluid vapor from a freezer evaporation zone into at least one of the first stage compressor zones and sorbing the working fluid vapor on the sorbent therein at a predetermined first pressure $P_L$, and desorbing the working fluid vapor from the sorbent in at least one of the second stage compressor zones and removing working fluid vapor therefrom at a predetermined second pressure $P_H$ which is higher than $P_L$;

(d) desorbing the working fluid vapor from the sorbent in at least one of the first stage compressor zones at a predetermined third pressure $P_M$ which is higher than $P_L$ but lower than $P_H$, (e) introducing (i.) the desorbed working fluid vapor at $P_M$, and (ii.) an additional amount of working fluid vapor from a refrigeration evaporation zone, into at least one of the second stage compressor zones and sorbing the working fluid vapor on the sorbent therein at a pressure of about $P_M$;

(f) minimizing the thermal capacitance differences between the first stage compression zones;

(g) minimizing the thermal capacitance differences between the second stage compression zones;

(h) condensing working fluid vapor removed from the second stage compressor zone at a pressure of about $P_H$ and transferring heat from the working fluid to the environment thereby forming a working fluid liquid;

(i) expanding a first portion of the working fluid liquid, and evaporating it in the freezer evaporation zone at a pressure of about $P_L$ by transferring heat from a freezer space to the freezer evaporation zone thereby cooling the freezer space;

(j) expanding a second portion of the working fluid liquid, and evaporating it in the refrigeration evaporation zone at a pressure of about $P_M$ by transferring heat from a refrigeration space to the refrigeration evaporation zone thereby cooling the refrigeration space and forming the additional amount of working fluid vapor;

(k) circulating a heat transfer fluid in a closed loop which comprises a heat removal zone and the first stage and second stage compressor zones while preventing the heat transfer fluid from directly contacting the sorbent;

(l) transferring heat from the heat transfer fluid in the heat removal zone to the environment;

(m) adding heat from a heat source over a predetermined period of time to the first stage compressor zone which is desorbing the working fluid vapor at $P_M$;

(n) cooling the coolest compressor in the first stage to a predetermined first stage bottoming temperature;

(o) adding heat from a heat source over a predetermined period of time to the second stage compressor zone which is desorbing the working fluid vapor at $P_H$;

(p) cooling the coolest compressor in the second stage to a predetermined second stage bottoming temperature;

(q) transferring heat from the sorbent in the compressor zones which are sorbing working fluid vapor to the heat transfer fluid, and from the heat transfer fluid to the sorbent in the compressor zones which are desorbing working fluid vapor thereby regenerating heat;

(r) repeating the steps sequentially in each of the other first and second stage compressor zones; and (s) wherein the amount of sorbent in the first stage compression zones is $M_1$, the amount of sorbent in the second stage compression zones is $M_2$, and adjusting the ratio $M_2/M_1$ to a predetermined value which is approximately equal to $$\left[\frac{(C_B - C_D)}{(C_F - C_H)}\right] \cdot \left[\left(\frac{Q_R}{Q_F} \cdot \frac{H_Y - H_Z}{H_W - H_X}\right) + 1\right]$$

wherein the adsorptive capacity of the sorbent for the working fluid at $P_L$ and the lowest temperature in the first stage compression zones is $C_B$, the adsorptive capacity of the sorbent for the working fluid at $P_M$ and the highest temperature in the first stage compression zones is $C_D$, the adsorptive capacity of the sorbent for the working fluid at $P_M$ and the lowest temperature in the second stage compression zones is $C_F$, the adsorptive capacity of the sorbent for the working fluid at $P_H$ and the highest temperature in the second stage compression zones is $C_H$, the enthalpy of the second portion of the working fluid liquid after its condensation and before its expansion is $H_X$, the enthalpy of the heated freezer working fluid vapor is $H_Y$, the enthalpy of the heated refrigerator working fluid vapor is $H_W$, the enthalpy of the first portion of the working fluid liquid after its condensation and before its expansion is $H_Z$, a predetermined design heat load in the refrigerator is $Q_R$, and a predetermined design heat load in the freezer is $Q_F$.

25. The process of claim 24, wherein cooling the coolest compressor in the first stage to a predetermined first stage bottoming temperature comprises circulating the heat transfer fluid in a closed loop which comprises the heat removal zone and the coolest first stage compressor zone but not the other first stage compressor zones.

26. The process of claim 24, wherein cooling the coolest compressor in the second stage to a predetermined second stage bottoming temperature comprises circulating the heat transfer fluid in a closed loop which comprises the heat removal zone and the coolest second stage compressor zone but not the other second stage compressor zones.

27. The process of claim 24, wherein cooling the coolest compressor in the first stage to a predetermined first stage bottoming temperature and cooling the coolest compressor in the second stage to a predetermined second stage bottoming temperature comprises circulating the heat transfer fluid in a second closed loop which comprises the heat removal zone, the coolest first stage compressor zone and the coolest second stage compressor zone but not the other first stage compressor zones nor the other second stage compressor zones.

28. The process of claim 24, wherein cooling the coolest compressor in the first stage to a predetermined first stage bottoming temperature and cooling the coolest compressor in the second stage to a predetermined second stage bottoming temperature further comprises circulating the heat transfer fluid in the second closed loop from the heat removal zone to the coolest first stage compressor zone, from the coolest first stage compression zone to the coolest second stage compressor zone, and from the coolest second stage compression zone to the heat removal zone.

29. The process of claim 24, wherein cooling the coolest compressor in the first stage to a predetermined first stage bottoming temperature and cooling the coolest compressor in the second stage to a predetermined second stage bottoming temperature further comprises circulating the heat transfer fluid in the second closed loop from the heat removal zone to a parallel circuit of the coolest first stage compressor zone and the coolest second stage compressor zone, and from the parallel circuit to the heat removal zone.

30. The process of claim 24, wherein the predetermined second stage bottoming temperature is about equal to the predetermined first stage bottoming temperature.

31. The process of claim 24, wherein the working fluid is ammonia, the sorbent is carbon, $P_L$ is from about 20 to about 40 psia, $P_M$ is from about 60 to about 90 psia, and $P_H$ is from about 150 to about 300 psia.

32. The process of claim 24, wherein the working fluid is ammonia, the sorbent is carbon, $P_L$ is about 30 psia, $P_M$ is about 73 psia, $P_H$ is about 212 psia, and wherein the predetermined first stage bottoming temperature and the predetermined second stage bottoming temperature are from about 70° to about 150° F.

33. The process of claim 18, further comprising exchanging heat between (i.) the first portion of the working fluid liquid before its expansion and (ii.) the working fluid vapor from the freezer evaporation zone thereby forming a heated freezer working fluid vapor; and exchanging heat between (i.) the second portion of the working fluid liquid before its expansion and (ii.) the working fluid vapor from the refrigerator evaporation zone thereby forming a heated refrigerator Working fluid vapor.

34. The process of claim 1, further comprising exchanging heat between (i.) the working fluid liquid after its condensation and before its expansion and (ii.) the working fluid vapor from the evaporation zone thereby forming a heated working fluid vapor.

* * * * *